Feb. 10, 1942. S. R. GITTENS 2,272,196
SELF-ATTACHING PATCH FOR WIRE CLOTH OR SCREENS
Filed Jan. 21, 1941 2 Sheets-Sheet 1
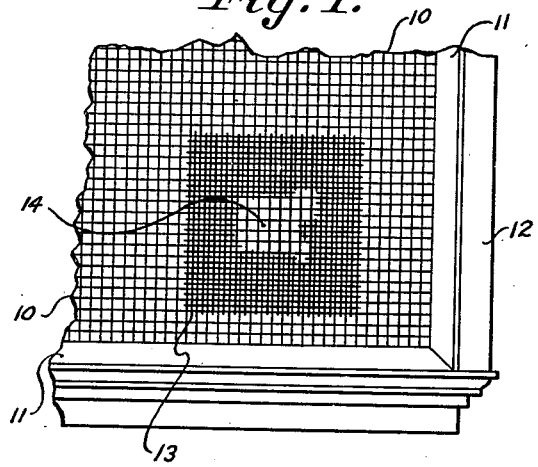
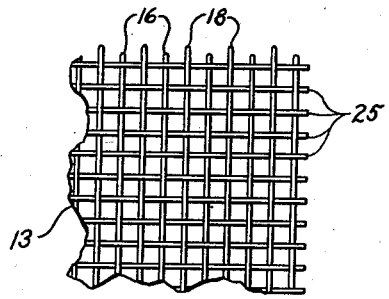
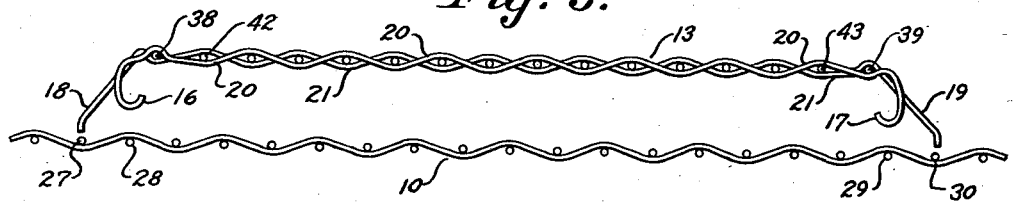
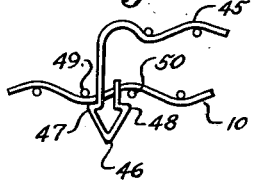
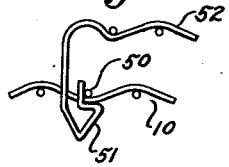
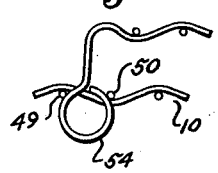
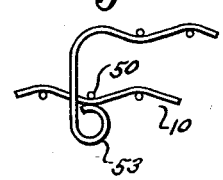
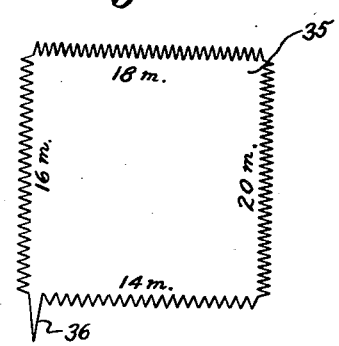
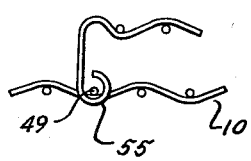
INVENTOR.
Sidney R. Gittens.
BY Virgil E. Woodcock
ATTORNEY.

Feb. 10, 1942. S. R. GITTENS 2,272,196
SELF-ATTACHING PATCH FOR WIRE CLOTH OR SCREENS
Filed Jan. 21, 1941 2 Sheets-Sheet 2
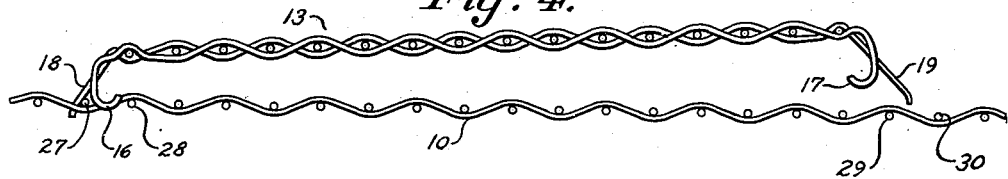
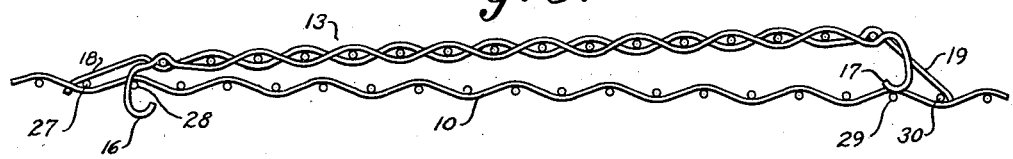
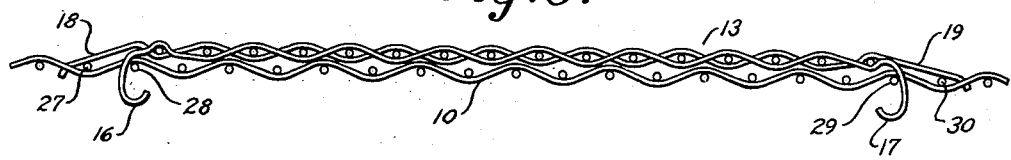
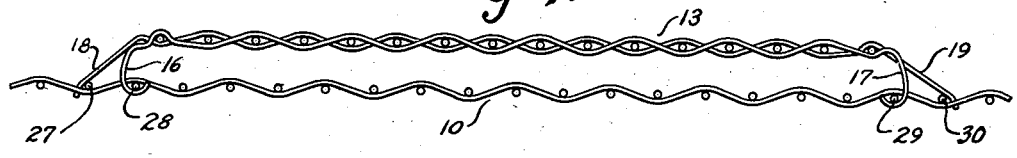
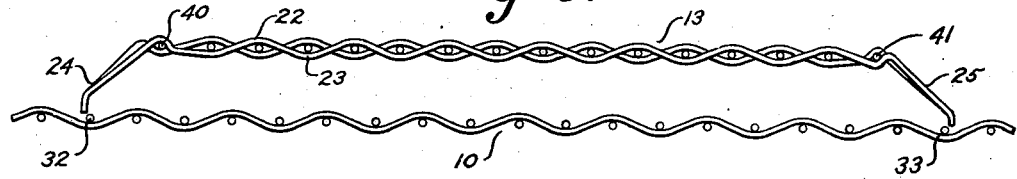
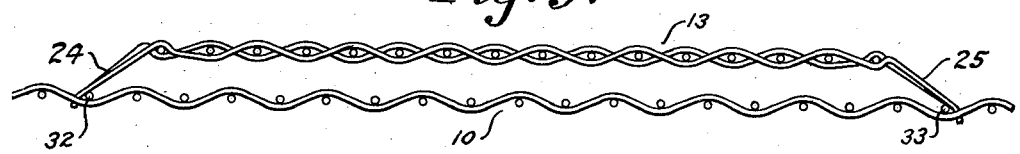
INVENTOR.
Sidney R. Gittens
BY Virgil E. Woodcock
ATTORNEY.

Patented Feb. 10, 1942

2,272,196

UNITED STATES PATENT OFFICE 2,272,196

SELF-ATTACHING PATCH FOR WIRE CLOTH OR SCREENS

Sidney R. Gittens, Philadelphia, Pa.

Application January 21, 1941, Serial No. 375,153

19 Claims. (Cl. 156—14)

My invention relates to an article of manufacture, more particularly to a simple and inexpensive patch to be used in the repair of screens of woven wire cloth, wire fabric, and the like.

It is an object of my invention to provide a patch which may be easily and readily applied to a hole or rupture in a screen and which besides accomplishing the effective repair of the screen presents a neat appearance.

It is a further object of my invention to provide a self-attaching patch, made entirely from woven wire, which may be of the same or of a different character than that of the screen to be mended.

It is a further object of my invention to provide a patch, formed of a woven wire, with a plurality of hooks pre-formed from the wires of the patch, the hooks being disposed along opposite edges and arranged for encirclement or interlocking engagement with the wires of the screen to be mended for the secure engagement of the patch to that screen.

It is a further object of my invention to provide a patch concave in shape with a plurality of screen-gripping means disposed along its periphery.

The protection afforded by the use of window screens, screen doors, and the like, is wholly defeated if through accident, or otherwise, the woven material is pierced or ruptured to an extent to leave an opening large enough through which insects may pass. Numerous schemes for patching screens have been devised. For example, it has been suggested that re-enforcing rings be covered with woven wire, the rings themselves carrying protruding elements which are to be bent around wires of the screen. It has also been suggested that clamps of the safety pin type be used to hold the patch in place and specially woven wire mesh has also been proposed, whereafter application of the patch to the screen to be mended the individual wires of the patch are to be bent into a holding position; and in some instances it has been proposed after application of the patch by weaving into the screen the wires of the patch, that the same wires may then be bent around wires of the screen to be mended.

The devices of the past all appear to require operations on both sides of the screen to be mended and upon both the patch and screen after applications of the patch thereto, and all fail to provide a patch, all the attaching elements of which are preformed and always ready for active engagement with the screen to be mended.

In carrying out my invention in one form thereof, gripping means or attaching elements are preferably located along opposite edges of the patch and are so spaced from each other as to be in position for engagement with wires of the screen to be mended. The gripping or attaching means preferably comprise a series of hooks or hook-like shapes formed from the ends of a number or all of the wires of the patch. The hooks, preferably in spaced rows, are disposed individually to engage certain wires of the screen to be mended. Sufficient resiliency is provided in the individual hook-wires so that by a slight pressure the hook-wires at opposite edges of the patch snap over certain wires of the screen to be mended firmly and securely to hold the patch in place. The remaining edges of the patch are preferably bent toward the screen to be mended, effectively to provide intimate engagement of the entire periphery of the patch with the screen to be mended. The generally concave shape of the patch further eliminates all sharp edges and provides a patch which is smooth and without any sharp edges on either side of the screen to be mended. The generally concave shape of the patch lends itself to a design by means of which a slight tension against the screen to be mended may be achieved, thus drawing and maintaining the hooks in effective engagement with certain wires of the screen to be mended.

For a more complete understanding of my invention, reference should now be had to the drawings in which:

Fig. 1 is a fractional elevation of a window, window screen, and a patch applied thereto;

Fig. 2 is an enlarged elevation of a fraction of the patch;

Figs. 3 to 7, inclusive, are sectional views of the patch and screen to be mended, and respectively show the patch in different positions during its application to the screen;

Figs. 8 and 9 are sectional views of the patch and screen taken at right angles to the section shown in Figs. 3 to 7, and respectively show the sides of the patch just before and after application of the patch to the screen.

Figs. 10 to 14 respectively show side views of additional forms of screen-gripping means; and Fig. 15 is a plan view of a comb and pick.

Referring to the drawings, I have shown my invention in one form as applied to a window screen 10, carried by a frame 11, which is mounted in the usual way in a window frame 12. As indicated in Fig. 1, a patch 13 covers and closes a hole 14 in the screen 10. Holes of this character frequently appear in screens and they are caused by a wide variety of accidents; from objects thrown therethrough, children at play, rust, and by rough handling of the screens taken from or placed in storage over the winter months.

While I have illustrated my invention as applied to a window screen, it is to be understood that it is not limited thereto since it may be applied to the repair of woven wire or woven cloth of widely differing character.

The article of manufacture comprising the primary subject matter of my invention consists of the patch 13, formed from woven wire of limited area, to which there need be added no fastening means other than those which are preformed from, and made an integral part of, the woven-wire patch itself. More particularly, from a plurality of the ends of the wires of the patch 13 at the periphery or perimeter thereof, there are formed individual screen-gripping elements which serve to hold the patch in place against the screen 10 to be mended.

In the preferred form of my invention, these gripping elements may be in the form of hooks. Thus at the left-hand side of the patch as viewed in Fig. 3, and at the top in Fig. 2, the hooks 16 are formed from the end of every other wire along that side of the patch. Similarly, the hooks 17 are formed from the end of every other wire along the opposite side of the patch 13. The ends of the remaining wires 18 along the left-hand side and the ends of the wires 19 at the opposite side are preformed to extend toward the screen 10 to be mended and outwardly to a greater extent than the hooks 16 and 17. The ends 18 and 19 form springs or resilient arms for reasons which will be later explained.

In the illustrated form of the invention, the patch 13 has been made from wire cloth having sixteen mesh or openings to the inch. The patch, shown enlarged, is about one inch square although, as will be later explained it may be made in many different sizes. Preferably it is made from bronze-wire cloth. In Fig. 3 the patch 13 is spaced above the screen 10 also of 16 mesh wire cloth. To simplify the drawings Figs. 3–14, only one cross wire of the screen has been illustrated while the two cross-wires 20 and 21 and the warp wires of the patch are shown in Figs. 3–9, inclusive.

As will be seen from Figs. 8 and 9, the ends of the warp wires along the two sides or edges of the patch are bent toward each other and away from the plane of the patch to form a series of resilient elements 24 and 25 along the respective left and right hand sides of the patch as viewed in Figs. 8 and 9. Thus the patch 13 is concave in shape and has provided at its periphery gripping elements and resilient arms or elements.

To repair a screen the patch 13 is centered over the opening or hole therein (omitted in Figs. 3–9, incl.) and one end, such as the left end as viewed in Fig. 4, is brought into a position such that the hooks 16 pass through the mesh of the screen 10 to be mended. At the same time the spring arms 18 and 19 extend over a warp wire 27 of screen 10. Usually a little pressure is applied to the patch by the thumb to insure movement of all of the arms 18 and hooks 16 into their proper positions as shown in Fig. 5. Thus the inner part of each hook 16 is pressed toward warp wire 28 with the return bend of each hook 16 in latching or interlocking position.

The opposite edge of the patch is now swung into position, the elements 16 serving to hinge the patch on the warp wire 28. As shown in Fig. 5, the hooks 17 engage the warp wire 29 of screen 10 along the outer portions of their inwardly curled ends while the arms 19 extend over the warp wire 30. By sliding the thumb over the patch 13 above and toward the elements 17, or otherwise applying a light pressure thereto, the elements 17 are moved outwardly and around the warp wire 29 and into the position shown in Fig. 6. Their outward movement is the result of the pressure against the inclined ends of the hooks 17 and the resistance offered by the warp wire 29. The resultant force causes the hooks to flex or yield until the open end clears wire 29 at which time they snap around it, Fig. 6. As the foregoing pressure is applied, the resilient arms 18 and 19 are held in flattened positions. However, as soon as the applied pressure is released as by withdrawal of the thumb the resiliency of the arms 18 and 19 lift the patch 13 to its normal position as shown in Fig. 7. The hooks 16 and 17 then partly encircles the wires 28 and 29 securely to lock or fasten the patch 13 to the screen 10.

Again referring to the movement of the patch into screen engaging position, the arm 24 and 25 are moved from the positions shown in Fig. 8 toward the screen 10. Since the arms 24 extend over cross wire 32 and the arms 25 extend over the wire 33, as the patch is moved toward the screen 10 the arms resiliently resist the forward movement. They eventually occupy positions similar to those shown in Fig. 6 for arms 18 and 19. As soon as the patch-applying pressure from the thumb is removed, however, the resilient arms 24 and 25 act with arms 18 and 19 to lift the patch upwardly into its normal position as shown in Figs. 7 and 9.

In the normal or final position of the patch 13, it will be observed the ends of the hooks 16 and 17 have been withdrawn or pulled back into the body of the screen 10. That is, the ends of the hooks do not protrude from the screen 10 but are disposed between the outer planes of it. Similarly, the ends of the arms 24 and 25 do not protrude and there are no sharp edges along the perimeter of the patch 13.

The general concave shape of the patch 13 has the advantage that after it is flattened and lengthened as shown in Fig. 6, it shortens during movement to the position of Fig. 7 with movement of the hooks 16 and 17 closer together. This insures that the hooks 17 will engage wire 29 of the screen and the hooks 16 with the wire 28, even if the wires 28 and 29 should be displaced from their positions as shown by the drawings, or in case they are not evenly spaced in the screen to which the patch is applied.

While the drawings are not to scale, a relative idea of the proportioning of the parts may be obtained by keeping in mind the fact the patch 13 is approximately one inch square. Since the screen 10 is of 16 mesh wire cloth the distance between wires 28 and 29 is exactly one inch though the patch may be made larger if desired. Exact dimensions need not be given since considerable latitude is permissible in the proportioning of the parts. Though the actual dimensions of the hooks 16 and 17 and of the arms 18, 19, 24 and 25, are very small indeed, I have found that the gripping ends or hooks and arms may be uniformly made and the patch may be easily and securely applied to the repair of screens.

Wire cloth of the foregoing type is manufactured and sold in rolls of different widths. The long wires or those extending lengthwise of the cloth are called the warp wires, while those that extend across the cloth are called the crosswires. A characteristic of woven wire or wire cloth is the remarkable accuracy of the spacing of the warp wires. The crosswises are not spaced so accurately and the variation may in an inch be as much as a sixteenth of an inch as between cloth of different manufacture. In consequence, the patch is preferably applied to the screen so that the hooks 16 and 17 engage the warp wires thereof which in nearly all makes will be evenly spaced and in position to be engaged by the gripping elements or hooks, as previously described.

While not essential, a comb or device 35 may be provided, along whose four sides serrations or teeth extend, the teeth at each side corresponding in number with woven cloth of standard mesh. Specifically, as marked on the comb (14m, 16m, 18m, and 20m) the teeth on the respective sides correspond with 14, 16, 18 and 20 mesh woven wire or wire cloth. The comb may be made of thin metal or moulded of any suitable material and the teeth need be only about three thirty-seconds or one-eighth of an inch long. If the side 16m of the comb 35 were to be placed against the screen 19, the teeth would neatly straddle the warp wires, or the warp wires would uniformly lie between adjacent teeth. If the side 16m of the comb were to be applied to the screen to engage the crosswires, they would not be likely to fit between the teeth due to their uneven spacing. The comb 35 may therefore be used to determine the even spacing of the wires of the screen to be mended and in that way the preferred direction of application of the patch to the screen may be determined, that is the patch will be applied so that the hooks 16 and 17 will engage spaced warp wires. If, as is sometimes the case, the crosswires are evenly spaced, the patch may be applied so that the hooks engage the crosswires. In fact the patch 13 may be applied either to the crosswires or to the warp wires but the latter are preferred for the reasons given.

Should the wires of the screen be bent or otherwise out of position, a prong or elongated pick or tooth 36 of the comb may be inserted into successive openings in the screen and the misplaced wire moved back into position. The pick 36 may also be used to advantage should the patch be applied to a screen in which the wire 29 or equivalent is located so far to the left of the final position of hooks 17 they, or some of them, fail to engage it. In such event the pick 13 may be used to slide the wire 29 to the right or toward the hooks 17 to insure engagement by all of them. In this connection I have found that warp wires of woven cloth may be readily moved sideways in the screen, whereas the cross wires are more or less rigidly fixed in position, this because in the weaving of the screen the warp wires are crimped or sharply bent around the cross wires to a materially greater extent than are the cross wires crimped over the warp wires.

Now that the principles of my invention have been explained it will be apparent many modifications may be made. For example, the arms 18 and 19 may be omitted entirely or they may be formed into gripping ends such as into hooks 16 and 17. Or, there may be a less number of hooks 16 and 17 along opposite sides of the patch. However, I prefer that there shall be at least two hooks at opposite sides of the patch 13. Additional hooks may also be provided in lieu of certain of the arms 24 and 25 although I do not now prefer such a construction.

As a further refinement, I prefer, in the construction of the patch 13, to crimp or bend the wires of the patch about the outermost wires thereof. Specifically, Fig. 3, the crosswire 20 is crimped or sharply bent partly around the warp wire 38. The next or adjacent cross wire 21 is crimped or sharply bent in the opposite direction partly around the wire 38. The result is a positive locking in place of the warp wire 38 and in handling the patch the chances of the end warp wire 38 sliding out of place are eliminated. Similarly, the wires 20 and 21 are bent or crimped partly around the outermost wire 39 at the opposite side of the patch and, Figs. 8 and 9, the same locking arrangement is provided for the outermost cross wires 40 and 41 at the remaining sides of the patch 13.

Again referring to Fig. 3, it will be observed the hook-wire 29 if pressed upwardly from hook 16 will fulcrum about the wire 42 since it passes beneath it and over the top of wire 38. This increases the permissible deflection of the gripping end before it takes a permanent set. The resilient arm 18 of course fulcrums or is deflected from the wire 38. If desired the hooks 17 at the opposite edge or side of the patch may be formed from wires 21 so that they will be free for deflection as far back as wire 43. I have found however that this further refinement while desirable is not essential, particularly if bronze-wire cloth is used for the patch. However a patch constructed from other kinds of wire cloth, including galvanized wire cloth is within the scope of my invention.

Instead of the hooks 16 and 17 which are relatively flat along one side and fairly sharply curved at opposite ends thereof, the gripping means or hook-like elements may take other forms. For example, as shown in Fig. 10, they may be wedge-shaped, the end of a crosswire 45 of the patch being bent to form a point 46 with shoulders 47 and 48 disposed for engagement with wires 49 and 50 of the screen to be mended. The width of each gripping end across the two shoulders 47 and 48 is slightly greater than the spacing of the adjacent wires 49 and 50 so that effective gripping or locking of the patch to the screen is accomplished. In applying such a patch the wires 49 and 50 are momentarily spread to permit the end 46 to pass therebetween and into a patch-holding position. The resilient arms (not shown in Fig. 10) then lift the patch from its illustrated position until the shoulders engage wires 49 and 50.

Somewhat easier to form is a hook 51 of the type shown in Fig. 11 wherein the end of wire 52 has a pointed end and an inclined side for sliding engagement with a wire 50 of the screen. Effective interlocking is provided by the shoulder which extends beneath the wire 50. The hook 53 of Fig. 13 is similar to hook 51 and differs in that the former is circular, the end 53 when the patch is lifted somewhat by the resilient arms engaging wire 50 at a point as viewed in Fig. 13 to the left of the center of the end 53.

A suitable hook-like element or gripping end, 54, Fig. 12, may also be circular and of a diameter slightly greater than the spacing of adjacent wires 49 and 50. The patch is held in place by the wedging action on the circular ends 54, and also by the fact the wires 49 and 50 in their final position prevent withdrawal of the ends 54. Even with the circular ends 54, shoulder portions are provided which resist withdrawal of the patch or which form gripping engagement with wires 49 and 50.

Somewhat similar to the hooks 16 and 17 of Fig. 3, is the gripping means of Fig. 14 wherein the end of each wire is partly curled with a sufficient opening left to receive a wire 49 of the screen 10.

Each of the foregoing modifications of my invention may be used with or without the resilient arms 18, 19, 24, and 25. Or, arms may be provided on the sides of the patch with the gripping means, or only on the sides of the patch which do not have gripping means, or gripping means and arms may be provided on all four sides of the patch.

In accord with my invention the patch may be of any size. In general a one inch, a one and one half, and a two inch patch will take care of most holes that may occur in screens. By making the patch in the foregoing sizes or multiples thereof, a patch of 14, 16, 18, or 20 mesh can be applied to a screen or wire cloth of 14, 16, 18, or 20 mesh or any multiple thereof since there will be present below the hooks at opposite sides of the patch, warp wires of the screen to be engaged thereby. The foregoing is made possible by the fact wire cloth is made with reference to the number of mesh to the inch. A warp wire is located at every half inch across the screen.

Thus, there will be a warp wire at the beginning and end of every inch regardless of mesh, and a patch of any mesh, if its hooks are spaced apart a half inch or an even multiple thereof will be universally applicable to wire cloth of widely differing types and weaves.

In the preferred form of my invention the gripping means are formed from the ends of the cross wires and certain resilient arms are formed by or from the ends of warp wires. The gripping means are spaced from the plane of the patch for engagement with the screen to be mended. The inclined position of the gripping means and of the arms gives to the patch, its generally concave shape and its resilience and characteristic whereby the hooks or hook-like elements may be spread and then retracted into interlocking engagement with wires of the screen to be mended.

In all forms of my invention, a patch is provided which is low in cost, neat in appearance, and which effects a permanent and satisfactory repair of holes in woven wire cloth. There are no sharp projecting ends to catch in clothing or which may be used to pull the patch from the screen.

While I have shown particular embodiments of my invention, it will be understood that I do not limit myself thereto, since many modifications may be made, and I therefore contemplate by the appended claims to cover any such modifications as fall within the spirit and scope of my invention.

What I claim is:

1. Means for repairing wire cloth, comprising a patch of wire cloth, a number of the ends of the wires at the perimeter thereof terminating in preformed shapes, each of which includes a portion so disposed as to engage wires of the cloth to be repaired to resist disengagement from said wires.

2. Means for repairing woven wire screens, comprising a patch of woven wire, a number of the ends of the wires at the perimeter thereof terminating in hook-like elements which, when applied to the woven wire of the screen to be repaired, form interlocking engagement therewith.

3. Means for repairing wire cloth comprising a patch of wire cloth, a number of the ends of the wires at the perimeter thereof preformed into hooks for partial encirclement of wires of the cloth to be repaired, thereby to fasten the patch to it.

4. A patch for screens of woven wire, comprising woven wire of limited area, a number of the ends of the wires thereof at the opposite edges of the patch preformed into hook-like elements which, upon application of the patch to the screen to be mended, automatically form interlocking engagement therewith, to hold the patch securely in place.

5. A patch for wire cloth, comprising woven wire of limited area, the ends of a plurality of the wires at opposite edges thereof preformed into hooks, the hooks along one of said opposite edges when engaged with one of the wires of the screen to be mended forming a hinge for rotation of the patch toward the screen to be mended, and the hooks at the other of said opposite edges having a spacing for rotation into wire-engaging position with another of the wires of the screen to be mended.

6. A patch for screens of woven wire, comprising woven wire of limited area, the ends of a number of the wires at opposite sides thereof preformed into hooks, the spacing between the hooks at said opposite edges being such that after hooks at one of said edges interlock with one of the wires of the screen to be mended and the patch is rotated toward the screen to be mended, the hooks at said opposite edge will come into wire-engaging position and interlock with another of the wires of the screen to be mended.

7. A patch for screens of woven wire cloth, comprising woven wire cloth of limited area, a number of the ends of the wires at opposite sides thereof extending at an angle to the plane of the patch and preformed into hook-like shapes each of which has a shoulder portion for gripping engagement with wires of the screen to be mended, and a number of the ends of the wires at the remaining sides of the patch extending at an angle from the plane of the patch in the same direction as said ends having said shapes for said gripping engagement.

8. A patch for screens of woven wire, comprising woven wire of limited area, a number of the ends of the wires at opposite sides thereof being preformed to provide a plurality of wire-engaging hooks, the hooks at one of the sides being spaced from the hooks at the other of said opposite sides for the engagement thereby of selected wires of a screen of selected weave, and the ends of the wires at the remaining sides of the patch being inclined from the plane of the patch in the same direction as the hooks so that after engagement of the hooks with wires of the screen to be mended, at least some of the said inclined portions engage other wires of the screen to produce a patch which is snugly-fitting throughout the perimeter thereof.

9. A patch for screens or woven wire cloth comprising woven wire cloth of limited area, the opposite sides of which terminate in a plurality of hooks preformed from the wires extending from said opposite sides, said hooks disposed for engagement with wires of the cloth to be mended, and spaced so that upon application of pressure they will snap into hooked relation with wires of the woven wire mesh to be repaired.

10. Means for repairing wire cloth, comprising a patch of wire cloth, some of the ends of the wires at the perimeter thereof having hook-like shapes for gripping engagement with the cloth to be mended and some of the ends of the wires of the patch forming resilient arms disposed at an obtuse angle to the patch for pressing engagement against wires of the cloth to be repaired.

11. Means for repairing wire cloth, comprising a patch of wire cloth of slightly concave shape, each of a number of the wires at the perimeter having a hook-like shape for interlocking engagement with wires of the cloth repaired.

12. Means for repairing wire cloth, comprising a patch of wire cloth of slightly concave shape, each end of a number of the wires at the perimeter thereof having a shape to interlock with wires of the cloth to be repaired to hold the patch in place and each end of an additional number of the wires resiliently engaging wires of the cloth to be mended.

13. Means for repairing wire cloth, comprising a patch of wire cloth, a number of the ends of the wires at the periphery thereof extending angularly away from the plane of the patch to impart to it a slightly concave shape and at least some of said ends having hook-like shapes for gripping engagement with wires of the cloth to be mended, the pressing of the patch against the cloth to be mended spreading said shapes outwardly and then into said gripping engagement.

14. Means for repairing wire cloth comprising a patch of wire cloth, a number of the ends of the wires at the perimeter thereof preformed into small circular shapes disposed in slightly spaced relation to the plane of the patch for gripping engagement with the wires of the cloth to be repaired.

15. Means for repairing wire cloth comprising a patch of wire cloth, each end of a number of the wires at the perimeter thereof preformed into circular shapes, the diameter of said shapes slightly exceeding the spacing of adjacent wires of the cloth to be repaired, said shapes being disposed in slightly spaced relation to the plane of the patch for gripping engagement with wires of the cloth to be repaired.

16. A patch for screens or woven wire cloth, comprising woven wire cloth of limited area, a number of the wires at the opposite sides of which terminate in a plurality of hooks preformed from the wires extending from said opposite sides, said hooks disposed at an angle to the plane of the patch for engagement with wires of the screen to be mended, and the spacing of said hooks across said patch corresponding with the spacing of two wires of the screen to be mended.

17. Means for repairing wire cloth, comprising a patch of wire cloth, a number of the ends of the wires extending from the body of the patch preformed into hook-like shapes for gripping engagement with wires of the cloth to be repaired, and the wires which cross over and under the outermost wires of the patch being crimped around them to lock them in place.

18. A patch for screens or woven wire cloth, comprising woven wire cloth of limited area, the end of every other wire at the opposite sides thereof terminating in a hook disposed at an obtuse angle to the plane of the patch for engagement with a wire of the screen to be mended, and the end of each wire intermediate said hooks extending outwardly and at angle to the plane of the patch to form resilient arms, said arms extending away from the patch farther than the hooks for engagement with a different wire of the screen to be mended than the one engaged by the adjacent hooks, and the ends of the wires at the remaining sides of the patch being inclined to the plane thereof to form additional resilient arms, the patch as a whole having a generally concave shape whereby upon pressing upon said patch to flatten the same the hooks on opposite sides of said patch are spread apart and upon release of said patch the hooks return to their original position.

19. A patch for screens or woven wire cloth, comprising woven wire cloth of limited area, the end of every other wire at the opposite sides thereof terminating in a hook disposed at an obtuse angle to the plane of the patch for engagement with a wire of the screen to be mended, and the end of each wire intermediate said hooks extending outwardly and at an angle to the plane of the patch to form resilient arms, said arms extending away from the patch farther than the hooks for engagement with a different wire of the screen to be mended than the one engaged by the adjacent hooks, and the ends of the wires at the remaining sides of the patch being inclined to the plane thereof to form additional resilient arms, the wires passing over and below the outermost wires at each of the sides of the patch being sharply bent partly around them so that one sharply bent portion partly encircles a wire on one side and the adjacent sharply bent portion partially encircles said last-named wire on the other side thereof securely to lock it in place, the patch as a whole having a generally concave shape whereby upon pressing upon said patch to flatten the same the hooks on opposite sides of said patch are spread apart and upon release of said patch the hooks return to their original position.

SIDNEY R. GITTENS.

CERTIFICATE OF CORRECTION.

Patent No. 2,272,196.  February 10, 1942.

SIDNEY R. GITTENS.

It is hereby certified that error appears in the printed specification of the above numbered patent requiring correction as follows: Page 2, second column, line 25, for "arm" read --arms--; page 4, first column, line 70, claim 1, after "repaired" insert --and--; and that the said Letters Patent should be read with this correction therein that the same may conform to the record of the case in the Patent Office.

Signed and sealed this 31st day of March, A. D. 1942.

(Seal)

Henry Van Arsdale,
Acting Commissioner of Patents.